(12) United States Patent
Myerscough et al.

(10) Patent No.: US 11,926,946 B2
(45) Date of Patent: Mar. 12, 2024

(54) METHOD OF REINFORCING A SEAM AND A PRODUCT WITH A REINFORCED SEAM IN ACCORDANCE WITH THE METHOD

(71) Applicant: OCEAN RODEO SPORTS INC., Victoria (CA)

(72) Inventors: Richard Myerscough, Victoria (CA); Ross Harrington, Victoria (CA)

(73) Assignee: Ocean Rodeo Sports Inc., Victoria (CA)

( * ) Notice: Subject to any disclaimer, the term of this patent is extended or adjusted under 35 U.S.C. 154(b) by 166 days.

(21) Appl. No.: 17/760,992

(22) PCT Filed: Sep. 17, 2020

(86) PCT No.: PCT/IB2020/058645
§ 371 (c)(1),
(2) Date: Mar. 16, 2022

(87) PCT Pub. No.: WO2021/053558
PCT Pub. Date: Mar. 25, 2021

(65) Prior Publication Data
US 2022/0298692 A1 Sep. 22, 2022

Related U.S. Application Data

(60) Provisional application No. 62/902,298, filed on Sep. 18, 2019.

(51) Int. Cl.
*D05B 93/00* (2006.01)
*B29C 65/00* (2006.01)
*B29C 65/62* (2006.01)

(52) U.S. Cl.
CPC .............. *D05B 93/00* (2013.01); *B29C 65/62* (2013.01); *B29C 66/0324* (2013.01)

(58) Field of Classification Search
CPC ........ D05B 93/00; D05B 93/02; B29C 65/62; B60R 2021/23316; B60R 2021/23576
(Continued)

(56) References Cited

U.S. PATENT DOCUMENTS 3,303,515 A * 2/1967 Lash ...................... D05B 93/00
112/424
4,646,357 A 2/1987 Nattrass
(Continued)

FOREIGN PATENT DOCUMENTS

GB 641 576 8/1950
GB 1 379 633 1/1975
(Continued)

OTHER PUBLICATIONS

International Search Report Corresponding to PCT/IB2020/058645 dated Dec. 18, 2020.
(Continued)

*Primary Examiner* — Danny Worrell

(57) ABSTRACT

A method of reinforcing a seam on a body involves folding a seam allowance into a series of accordion folds to form a series of parallel reinforcement layers. The parallel reinforcement layers are of similar size and form a ridge. A ridge cap of flexible material is placed over the ridge. The ridge cap provides at least one further parallel reinforcement layer. The method involves securing the ridge cap and parallel reinforcement layers together with rows of stitching, with the stitching extending through all of the parallel reinforcement layers.

2 Claims, 4 Drawing Sheets

(58) Field of Classification Search
USPC .............................. 112/423, 424, 425, 426
See application file for complete search history.

(56) References Cited

U.S. PATENT DOCUMENTS

| | | | |
|---|---|---|---|
| 5,114,180 A | 5/1992 | Kami et al. | |
| 5,244,280 A | 9/1993 | Porter et al. | |
| 5,423,611 A | 6/1995 | Sherrard | |
| 7,117,545 B2* | 10/2006 | Hannon | B32B 27/12 |
| | | | 2/275 |
| 7,275,266 B1* | 10/2007 | Grilliot | A41D 13/01 |
| | | | 2/81 |
| 7,287,478 B2 | 10/2007 | Keshavaraj et al. | |
| 10,131,092 B1* | 11/2018 | Cook | B29C 65/02 |
| 2005/0081281 A1* | 4/2005 | Hannon | B29C 66/133 |
| | | | 2/275 |
| 2018/0134246 A1 | 5/2018 | Ochiai et al. | |
| 2019/0084519 A1* | 3/2019 | Lowe | B60R 21/235 |
| 2019/0111881 A1* | 4/2019 | Maximino | B60R 21/232 |
| 2022/0298692 A1* | 9/2022 | Myerscough | B29C 66/1352 |

FOREIGN PATENT DOCUMENTS

| | | | | |
|---|---|---|---|---|
| GB | 1 422 447 | | 1/1976 | |
| GB | 2 071 564 A | | 9/1981 | |
| WO | WO-2021053558 A1 * | | 3/2021 | ............. B29C 65/62 |

OTHER PUBLICATIONS

Written Opinion Corresponding to PCT/IB2020/058645 dated Dec. 18, 2020.

* cited by examiner

METHOD OF REINFORCING A SEAM AND A PRODUCT WITH A REINFORCED SEAM IN ACCORDANCE WITH THE METHOD

FIELD

There is described a method of reinforcing a seam and a product with a reinforced seam in accordance with the method. This method was developed to reinforce the seams of inflatable structures, but potentially has wider application.

BACKGROUND

In the manufacture of inflatable structures flexible materials are typically sewn together to form the inflated frame. Seams are currently the weak link on these frames and restrict the full loading force potential of the materials used to make the frame.

The air holding feature of the envelope is typically achieved by the insertion of a separate gas holding bladder, or by welding the seams of the outer envelope by means of hot melt tape, glue, or other welding techniques. The current state of the art sewn seam places lines of stitching, made up of needle holes and thread on the load bearing surfaces of the materials. These seams are also off balanced with more force on one side than the other creating increased stress on one side of the seam.

An example of this is the use of composite materials that use ultra-strong substrates such as ultra-high molecular weight polyethylene (UHMWPE) in their construct. A very light 60 grams per square meter (GSM) composite material may have a tear fail rate in excess of 300 lbs, however using existing seam technology, the seam will fail at only 150 pounds of force, therefore limiting the maximum inflation pressure the material could deliver if it had a stronger seam. The problem is exacerbated by the fact that if a safety margin is required, a safe operating pressure in pounds per square inch (PSI) might be recommended at 50% of the fail rating.

With 150 gsm Dacron seam failure starts at 170 pounds of pulling force, and fails completely with 220 pounds of pulling force. With a 7 inch diameter inflated tube of 150 gsm Dacron, using hoop stress calculations, the maximum pressure before failure using the standard industry seam is 21 psi. With a safe operating psi set at 50% of the fail rating, the maximum pressure for a Dacron 7 inch diameter tube is 10.5 psi. This psi rating corresponds well to the maximum recommended pressure used of these products.

In contrast, with 70 gsm composite laminate material seam failure starts at 100 pounds of pulling force, and fails completely with 200 pounds of pulling force. With a 7 inch diameter inflated tube of 70 gsm composite laminate material, using hoop stress calculations, the maximum pressure before failure using the standard industry seam is 12.5 psi. With a safe operating psi set at 50% of the fail rating, the maximum pressure for a 70 gsm composite laminate material is 6.25 psi. Unfortunately, this is not an adequate psi for use in most pressurized air frame applications; therefore ultra-light weight composite laminate materials have not been successfully used for applications, such as pressurized frames on kites, wings or masts.

As inflation pressure increases, increased hoop stress forces expansion of the material and seams. The failing point starts at the needle holes, as the thread used to sew the seam holds secure with little or no stretch, while the needle holes elongate due to material stretch caused by inflation and or hoop stress. The elongation of the needle holes is irreversible once started. The stretch of the seam during the failure process has an undesirable effect, as inconsistent seam creep of just a fraction of an inch along the leading edge of an inflated wing can cause twists and irregular bumps in the inflated spars resulting in unbalanced flying performance.

Needle-hole elongation is particularly destructive on composite materials that use monolithic films to stabilize woven core materials. Once the needle holes have been excessively elongated, the stabilizing films are torn away from the substrate and the seam integrity has been weakened. This weakening of the seam may result in a catastrophic seam failure.

SUMMARY

According to one aspect, there is provided a method of reinforcing a seam on a body. The method involves positioning two edges of flexible material together to form a seam allowance and positioning a first row of stitching on the seam allowance spaced from the body. The method involves folding the seam allowance into a series of accordion folds to form the seam allowance into a series of parallel reinforcement layers, with the parallel reinforcement layers being of similar size and forming a ridge. The method involves positioning a ridge cap of flexible material over the ridge, with the ridge cap providing at least one further parallel reinforcement layer of the series of parallel reinforcement layers. The method involves securing the ridge cap and parallel reinforcement layers together with further rows of stitching positioned between the first row of stitching and the body, with the stitching extending through all of the parallel reinforcement layers.

According to another aspect, there is provided a product with a reinforce seam which includes a body made from flexible material, with two edges of the flexible material positioned together to form a seam allowance. A first row of stitching on the seam allowance is spaced from the body. The seam allowance has a series of accordion folds, which provide a series of parallel reinforcement layers of similar size forming a ridge. A ridge cap of flexible material is positioned over the ridge, with the ridge cap providing at least one further parallel reinforcement layer of the series of parallel reinforcement layers. The ridge cap and parallel reinforcement layers are secured together with further rows of stitching positioned between the first row of stitching and the body, with the stitching extending through all of the parallel reinforcement layers.

This reinforced seam relocates the needle holes and thread away from the load bearing surface of the material, to the ridge. The ridge receives all needle holes and threads above the surfaces of the material, distributing the forces within the folded layers. The ridge cap of flexible material is positioned over the ridge and secured to the parallel reinforcement layers. This reinforce seam configuration distributes the hoop stress forces of inflation and pulling forces equally on both sides of the seam and allows the materials to perform to their full potential.

Beneficial results have been obtained when the series of accordion folds includes a first accordion fold oriented in a first direction and forming a first reinforcement layer of the series of parallel reinforcement layers. This first reinforcement layer is secured parallel to the seam allowance by a second row of stitching. A second accordion fold is oriented in a second direction and forms a second reinforcement layer of the series of parallel reinforcement layers.

A remote end of the seam allowance may is folded over the ridge and oriented in the first direction to serve as a ridge cap, while forming a third reinforcement layer of the series of parallel reinforcement layers. This third reinforcement layer is secured by the third row of stitching and, if required, a fourth row of stitching.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A method of reinforcing a seam on a body will now be described with reference to FIG. 1 through FIG. 8. FIG. 1 through 4 depict the method as applied to an inflatable tubular air frame. FIG. 5 through 8 depict the method as applied to a load bearing surface. There is a single method, the illustrations are simply intended to show that the method can apply to a tubular body, such as an inflatable tubular air frame or to planar abutting connections of load bearing surfaces on a body. The load bearing surface may occur in a wide variety of products, possible examples might be a dry bag or a backpack.

Figure 1:
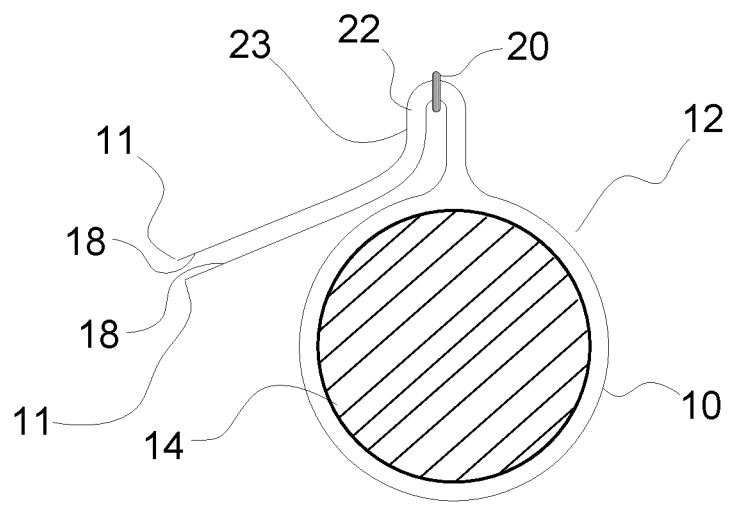
FIG. 1 is a first end elevation view, in section, showing a first step of fabricating a seam on an inflatable tube of an air frame.
Figure 4:
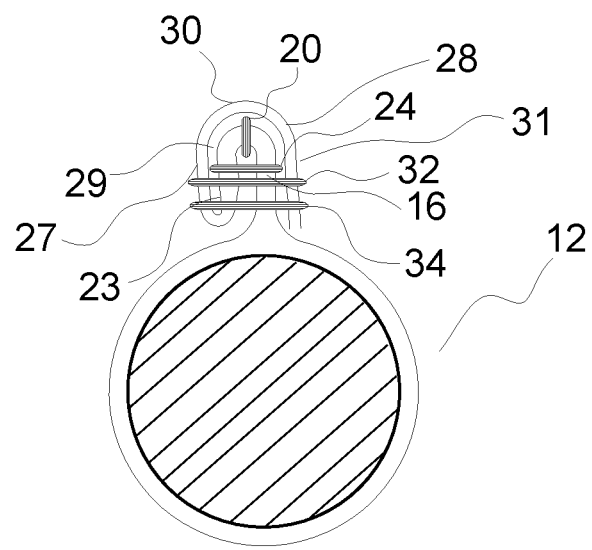
FIG. 4 is a fourth end elevation view, in section, showing a fourth step of fabricating a seam on the inflatable tube of FIG. 3.
Figure 5:
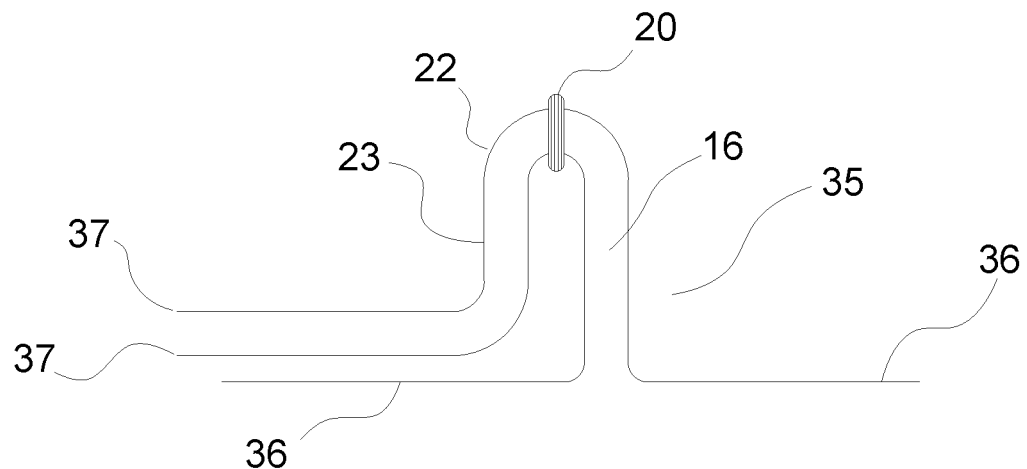
FIG. 5 is a first end elevation view, in section, showing a first step of fabricating a seam on a load bearing surface.

The method involves positioning two edges of flexible material together to form a seam allowance 16. Referring to FIG. 1, there is a single sheet of flexible material 10 having two edges 11. The single sheet of flexible material 10 is formed into a tubular body 12. A gas holding inner bladder 14 is positioned within tubular body 12. A first row of stitching 20 is placed on seam allowance 16 spaced from tubular body 12. First row of stitching 20 secures inner surfaces 18 of seam allowance 16 together. Referring to FIG. 5, a body, generally indicated by reference numeral 35, is intended to depict a portion of a load bearing surface. Body 35 has two sheets 36 of flexible material positioned in abutting relation with the edges 37 of sheets 36 forming a seam allowance 16. A first row of stitching 20 is placed on seam allowance 16 spaced from body 35. First row of stitching 20 secures inner surfaces 18 of seam allowance 16 together. Notwithstanding, the differences between FIG. 1 through FIG. 4 and FIG. 5 through FIG. 8, the manner of reinforcing first row of stitching 20 is identical.

In broad terms, the manner of reinforcing first row of stitching 20 involves folding seam allowance 16 into a series of accordion folds to form seam allowance 16 into a series of parallel reinforcement layers. The parallel reinforcement layers are of similar size and are secured together to protect first row of stitching 20.

The parallel reinforcement layers form a ridge. A ridge cap of flexible material is positioned over the ridge and secured to the parallel reinforcement layers and the seam allowance.

Figure 2:
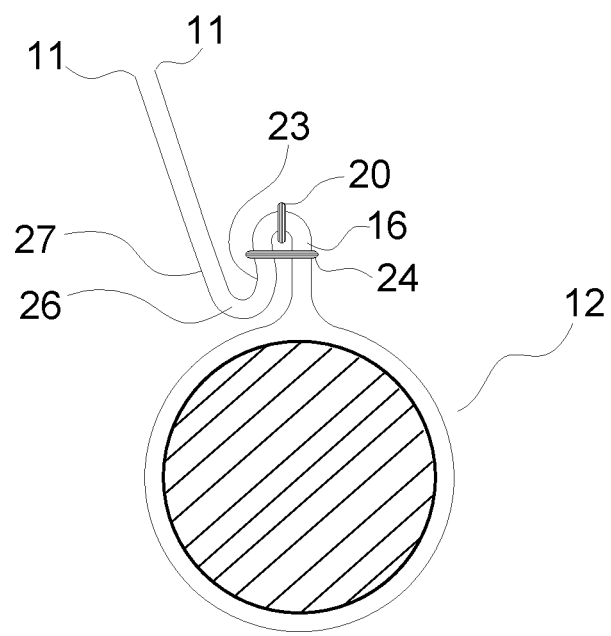
FIG. 2 is a second end elevation view, in section, showing a second step of fabricating a seam on the inflatable tube of FIG. 1.

The preferred embodiments will now be described in detail with reference to the Figures Referring to FIG. 1, the series of accordion folds, described above includes a first accordion fold 22 oriented in a first direction (depicted as downward on the page), which forms a first reinforcement layer 23 of the series of parallel reinforcement layers described above. Referring to FIG. 2, first reinforcement layer 23 is secured parallel to seam allowance 16 by a second row of stitching 24. Referring to FIG. 2, a second accordion fold 26 is oriented in a second direction (depicted as upward on the page), which forms a second reinforcement layer 27 of the series of parallel reinforcement layers.

Figure 3:
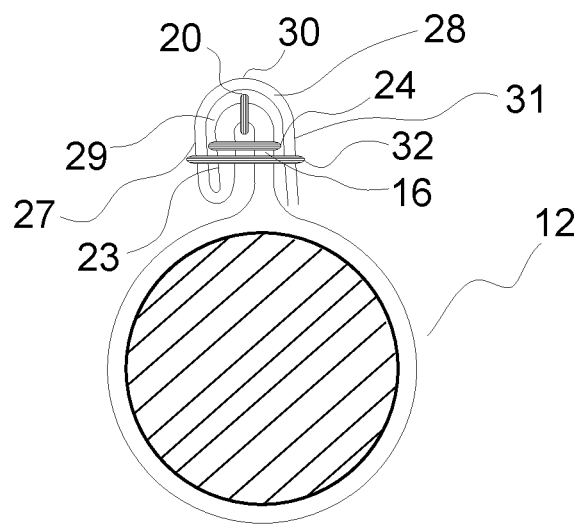
FIG. 3 is a third end elevation view, in section, showing a third step of fabricating a seam on the inflatable tube of FIG. 2.

Referring to FIG. 3, parallel reinforcement layers (first reinforcement layer 23, second reinforcement layer 27, and seam allowance 16) when secured together form a ridge 29. A remote end 28 of seam allowance 16 is folded over ridge 29 and oriented in the first direction (depicted as downward on the page) to serve as a ridge cap 30. Remote end 28 of seam allowance 16 also forms a third reinforcement layer 31 of the series of parallel reinforcement layers. This third reinforcement layer 31 is secured by third row of stitching 32 as depicted in FIG. 3 and, if required, a fourth row of stitching 34 as depicted in FIG. 4. The addition of ridge cap 30 and third reinforcement layer 31 serves to bury first row of stitching 20 within the reinforcement layers created by the accordion folds, distributing the hoop stress forces of inflation and pulling forces equally on both sides of the seam. It is to be noted that second row of stitching 24, third row of stitching 32 and fourth row of stitching 34 are all positioned between first row of stitching 20 and tubular body 12.

Figure 6:
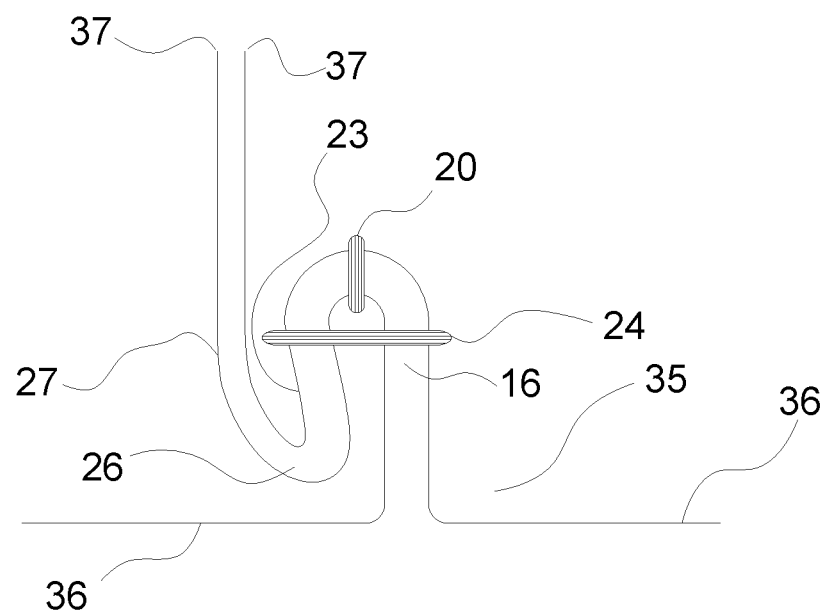
FIG. 6 is a second end elevation view, in section, showing a second step of fabricating a seam on a load bearing surface of FIG. 5.

Referring to FIG. 5, the series of accordion folds, described above includes a first accordion fold 22 oriented in a first direction (depicted as downward on the page), which forms a first reinforcement layer 23 of the series of parallel reinforcement layers described above. Referring to FIG. 6, first reinforcement layer 23 is secured parallel to seam allowance 16 by a second row of stitching 24. Referring to FIG. 6, a second accordion fold 26 is oriented in a second direction (depicted as upward on the page), which forms a second reinforcement layer 27 of the series of parallel reinforcement layers.

Figure 7:
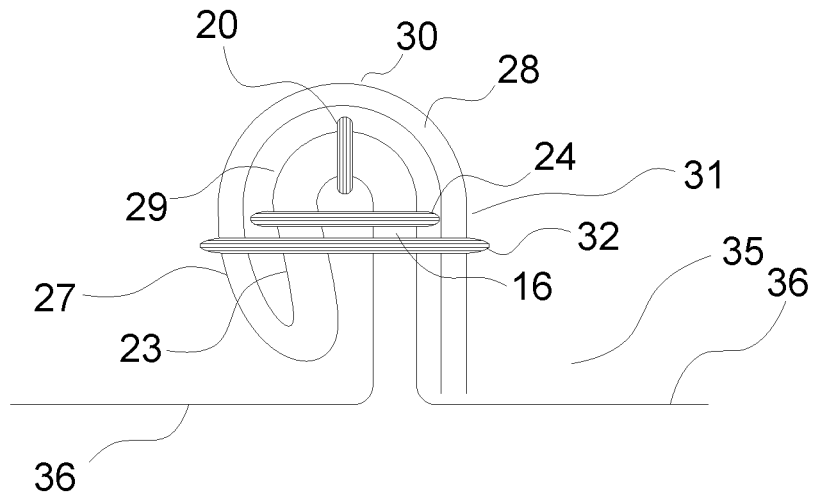
FIG. 7 is a third end elevation view, in section, showing a third step of fabricating a seam on a load bearing surface of FIG. 6.
Figure 8:
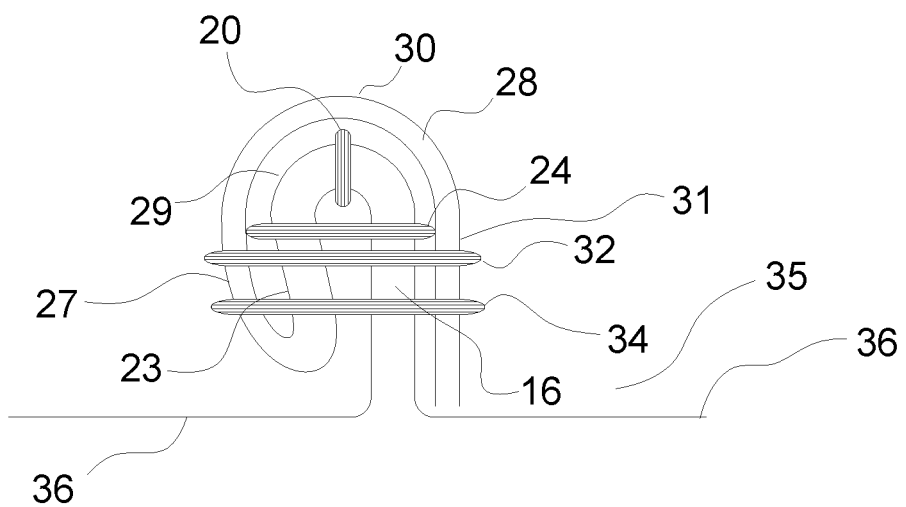
FIG. 8 is a fourth end elevation view, in section, showing a fourth step of fabricating a seam on a load bearing surface of FIG. 7.

Referring to FIG. 7, parallel reinforcement layers (first reinforcement layer 23, second reinforcement layer 27, and seam allowance 16) when secured together form a ridge 29. A remote end 28 of seam allowance 16 is folded over ridge 29 and oriented in the first direction (depicted as downward on the page) to serve as a ridge cap 30. Remote end 28 of seam allowance 16 also forms a third reinforcement layer 31 of the series of parallel reinforcement layers. This third reinforcement layer 31 is secured by third row of stitching 32 as depicted in FIG. 7 and, if required, a fourth row of stitching 34 as depicted in FIG. 8. The addition of ridge cap 30 and third reinforcement layer 31 serves to bury first row of stitching 20 within the reinforcement layers created by the accordion folds, distributing the hoop stress forces of inflation and pulling forces equally on both sides of first row of stitching 20. It is to be noted that second row of stitching 24, third row of stitching 32 and fourth row of stitching 34 are all positioned between first row of stitching 20 and body 35. This protects first row of stitching 20.

When forming this reinforced seam in accordance with the method, care must be taken to have seam allowance 16 long enough to create first reinforcement layer 23 with first accordion fold 22, second reinforcement layer with second accordion fold 26, leaving enough excess length to fold remote end 28 over ridge 29 to form ridge cap 30 and third reinforcement lawyer 31.

The manner of securement is shown as stitching. This is because only stitching extends through all the parallel reinforcement layers.

It will be appreciated that the same result can be accomplished with just three seams. Fourth row of stitching 34 has been added to disperse more load. It is to be noted that third row of stitching 32 and fourth row of stitching 34 secure all layers of material together. The resulting seam sits in balance receiving equal force on each side from forces such as Hoop Stress and pulling forces. First row of stitching 20 is buried within and protected by the accordion folds, which distribute the hoop stress forces of inflation equally on both sides of the seam.

ADVANTAGES

The innovation presented herein describes an innovative reinforced seam, which has proven to increase the seam strength by 20% or more, as compared to the current state of the art seam. This new strong seam can be used on all flexible materials such as, but not limited to woven and knit fabrics, monolithic films or composites of films, weaves and knits. This new seam has been particularly effective at withstanding the hoop stress forces applied to composite materials that use film layer to support underlying woven substrates as used to make inflatable structures such as inflatable kites, wings and tents.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of reinforcing a seam, comprising:
   positioning two edges of flexible material together to form a seam allowance and positioning a first row of stitching on the seam allowance spaced from a body formed by the flexible material;
   folding the seam allowance into a series of accordion folds to form the seam allowance into a series of parallel reinforcement layers, with the reinforcement layers being of similar size and forming a ridge;
   positioning a ridge cap of the flexible material over the ridge, with the ridge cap providing at least one further parallel reinforcement layer of the series of parallel reinforcement layers; and
   securing the ridge cap and parallel reinforcement layers together with further rows of stitching positioned between the first row of stitching and the body, with the stitching extending through all of the parallel reinforcement layers,
   wherein the series of accordion folds comprises:
     a first accordion fold oriented in a first direction and forming a first reinforcement layer of the series of parallel reinforcement layers, the first reinforcement layer being secured parallel to the seam allowance by a second row of stitching, a second accordion fold oriented in a second direction and forming a second reinforcement layer of the series of parallel reinforcement layers, the second reinforcement layer being secured parallel to the first reinforcement layer and the seam allowance by a third row of stitching, and
   wherein a remote end of the seam allowance is folded over the ridge and oriented in the first direction to serve as the ridge cap, while forming a third reinforcement layer of the series of parallel reinforcement layers, the third reinforcement layer being secured by at least one of the third row of stitching or a fourth row of stitching.

2. A product, comprising:
   a body made from flexible material;
   a first row of stitching formed on a seam allowance, the seam allowance being formed by positioning together of two edges of the flexible material, the seam allowance being spaced from the body and having a series of accordion folds to form the seam allowance into a series of parallel reinforcement layers, the parallel reinforcement layers being of similar size and forming a ridge;
   a ridge cap of the flexible material positioned over the ridge, the ridge cap providing at least one further parallel reinforcement layer of the series of parallel reinforcement layers; and
   further rows of stitching, positioned between the first row of stitching and the body, securing the ridge cap and the series of parallel reinforcement layers together, the stitching extending through all of the parallel reinforcement layers,
   wherein the series of accordion folds comprises:
     a first accordion fold oriented in a first direction and forming a first reinforcement layer of the series of parallel reinforcement layers, the first reinforcement layer being secured parallel to the seam allowance by a second row of stitching, and a second accordion fold oriented in a second direction and forming a second reinforcement layer of the series of parallel reinforcement layers, the second reinforcement layer being secured parallel to the first reinforcement layer and the seam allowance by a third row of stitching, and
   wherein a remote end of the seam allowance is folded over the ridge and oriented in the first direction, thereby forming a third reinforcement layer of the series of parallel reinforcement layers, the third reinforcement layer being secured by at least one of the third row of stitching or a fourth row of stitching.

* * * * *